United States Patent Office 3,145,050
Patented Aug. 18, 1964

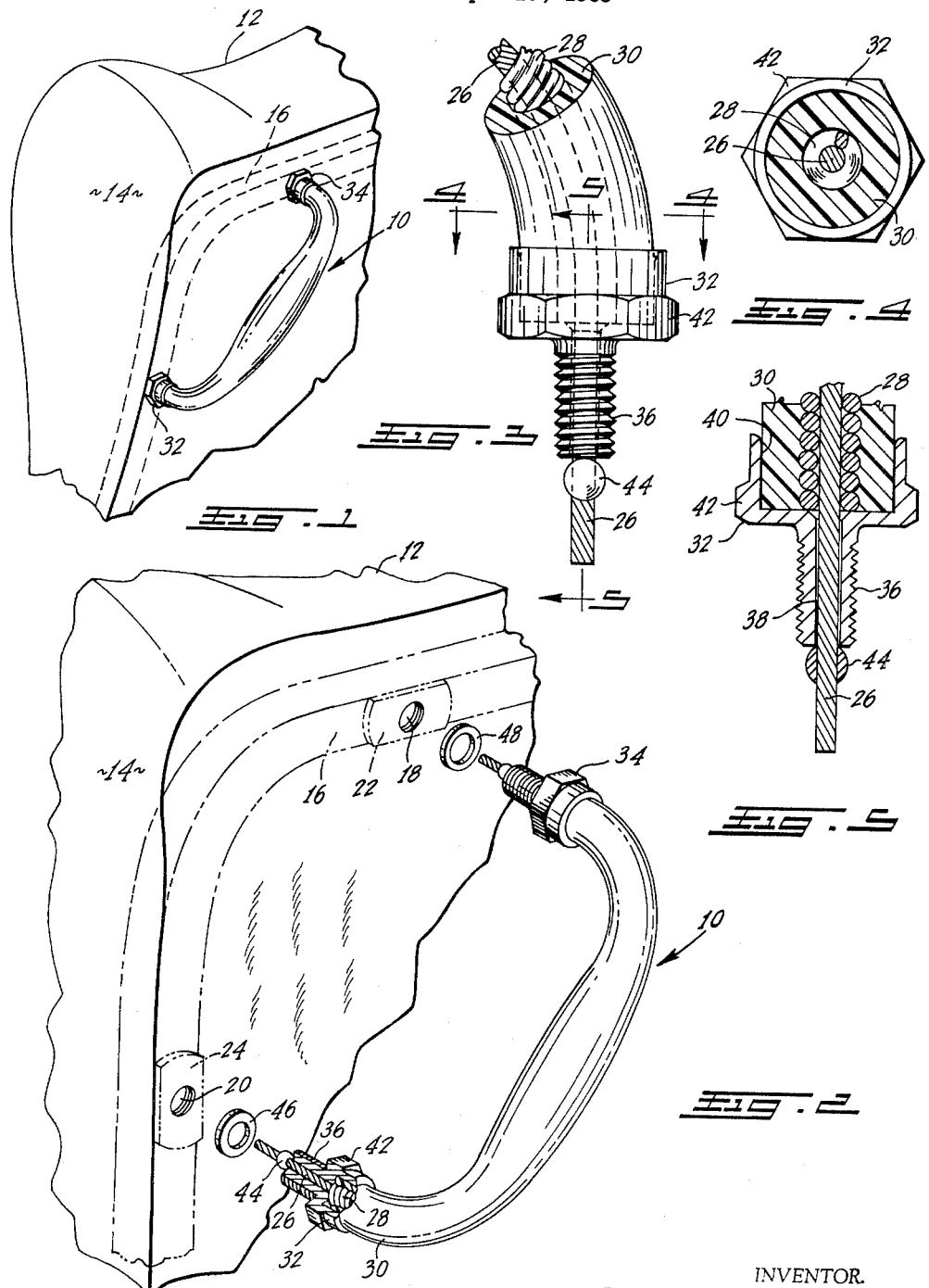

3,145,050
FLEXIBLE HANDLE
Robert L. Edwards, Mansfield, Ohio, assignor to National Seating Company, Mansfield, Ohio, a corporation of Ohio
Filed Sept. 10, 1963, Ser. No. 307,868
9 Claims. (Cl. 297—183)

The present invention relates generally as indicated to a flexible handle and relates more specifically to a flexible handle construction having particularly advantageous use in transportation seating installations.

In this last type of seating, it has long been common to provide loops or handle formations in the nature of loops at the upper aisle corners of the seats, for use by standees and also by persons using the seating in entering and extricating themselves from the same, but these have been rigid. Some of these well-known handles are, in fact, bare metal, and even where a covering may be provided, there is no yielding or collapsing of this handle. Such a prior handle, moreover, usually is approximately in the plane of the back of the seat, whereby it projects upwardly and/or outwardly and may tend to be obstructive.

A non-yielding handle cannot safely be mounted in a relatively non-obstructive position against the back of the seat, since it would then constitute a rigid protrusion toward a passenger in the seat next behind and hazardous in the event of any mishap or unexpected movement of the passenger which would throw him against such a handle.

It is a primary object of the present invention to provide a flexible handle which can thus be safely mounted in a relatively non-obstructive position at the back of the seat in the upper aisle corner region thereof in most instances. Because of the yielding or collapsible nature of this new handle, which will, while ordinarily shape-retaining, give under the application of force regardless of how the same may be applied, thereby eliminating potential injury to a passenger by the presence of such handle. Due to the resiliency of the handle construction, it will return to its normal self-supported position upon cessation of the applied force.

A further object of the present invention is to provide an improved means for mounting the flexible handle on such suitable mounting surface.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view showing the flexible handle of the present invention mounted on the back of a vehicle seat;

FIG. 2 is an enlarged exploded view with portions of the flexible handle broken away to show more clearly the manner in which the handle is mounted on the vehicle seat;

FIG. 3 is an enlarged elevational view, partially broken away, of one end of the handle construction;

FIG. 4 is a sectional view taken on lines 4—4 of FIG. 3; and

FIG. 5 is a sectional view taken on lines 5—5 of FIG. 3.

Referring now to the drawings, wherein like parts are indicated by like reference characters, the flexible handle of the present invention is generally indicated at 10 and is shown in FIG. 1 in its installed condition on the rear of a vehicle seat 12. In the form shown, the vehicle seat 12 represents a bus seat although it should be understood, and it will become apparent as the description proceeds, that the indicated installation environment is illustrative only and that the flexible handle 10 could be equally satisfactorily employed with other suitable mounting surfaces. The seat 12 is provided with a covering 14 which extends in the usual manner completely around the seat including the back thereof. A tubular frame member 16 forming part of the seat construction is provided adjacent the rear wall of the seat 12 and the flexible handle 10 is mounted to this tubular frame member as will be presently described. The specific construction of the seat 12 forms no part of the present invention and has been described only to the extent necessary to fully understand the manner in which the flexible handle of the present invention can be mounted thereon.

To adapt the seat 12 and more particularly the tubular frame 16 for receiving the flexible handle 10, a pair of holes 18 and 20 is drilled through the front and rear walls of the tubular frame 16. Threaded plates 22 and 24 are then spot welded to the rear face of the tubular frame with the central threaded openings overlying the drilled holes in the tubular frame. The threaded plates 22 and 24 are adapted to receive the end fittings of the handle 10 as will be hereinafter described.

The flexible handle 10 includes a core assembly comprising a steel multi-strand cable 26 and a steel coiled wire casing 28 disposed therearound. A plastic outer cover 30 is molded around the coiled wire casing 28 to form an effective unitary handle construction. Prior to the molding of the plastic cover 30 around the casing 28, the latter, which is provided in straight lengths, and the cable 26 subsequently inserted therethrough, is bent at both ends to assume the generally U-shape configuration shown in the final handle construction, with the plastic cover 30 being thereafter molded around such form. The coiled wire casing 28 is laterally resiliently deformable whereby the handle when mounted can be flexed when force is applied thereagainst, as will be hereinafter described. The plastic cover 30 is relatively soft to enhance grasping thereof and is also resiliently deformable whereby the handle assumes its normal self-supporting position in the absence of force thereon.

End fittings 32 and 34 of identical construction are provided at opposite ends of the handle for attaching the handle 10 to the tubular frame 16. As best shown in FIG. 5, the shank end 36 of the fitting 32 is formed with a longitudinally extending bore 38 for receiving the cable 26, and an enlarged circular counterbore or recess 40 is formed at the other end of the fitting 32 for receiving the adjacently disposed ends of the casing 28 and the cover 30, with the cover 30 being telescoped therewithin to accommodate free turning of the fitting 32 relative thereto for mounting the handle to the tubular frame 16. The shank end 36 of the end fitting 32 is provided with external threads engageable with the threaded opening in the associated plate 24, and a hexagonal portion 42 intermediate the ends of the fitting is provided to facilitate wrench installation of the handle 10 on the frame 16.

The cable 26 extends outwardly from the shank 36 of the end fitting 32 when the latter is in position with the circular recess 40 thereof telescoped around the plastic cover 30. As noted above, the end fitting 32 is freely turnable relative to the cover 30 and in order to retain the fitting 32 in such position, suitable retaining means, for example a ball retaining member 44 having an opening therethrough, is inserted around the cable 26 and swaged thereto. The ball retaining member 44 is positioned on the cable to provide minimum end play of the end fitting 32 but still accommodate rotation thereof. The opposite end fitting 34 is retained on the opposite end of the handle 10 in the same manner.

To install the flexible handle 10 on the tubular frame 16, the threaded plates 22 and 24 are located on the frame 16 and holes are punched in the seat cover 14 large enough to accommodate the threaded end portion 36 of the end fitting 32. The threaded shank 36 is then threaded into the plate 24 and tightened in place by means of a suitable tool, for example a wrench, engageable around the hexagonal intermediate section 42 of the end fitting. Prior to the threading of the threaded shank of the end fitting into the plate 24, a washer 46 is preferably disposed around the shank for spacing the intermediate portion 42 of the fitting 32 from the seat cover 14. The opposite end of the flexible handle 10 is then mounted on the associated threaded plate 22 by means of the end fitting 34 in exactly the same manner, a washer 48 being similarly provided. It will be apparent that the sequence of mounting the end fittings 32 and 34 is immaterial. The final tightening of the end fittings 32 and 34 thereby provides a self-supporting yet flexible handle member.

Because of the resiliently deformable nature of the coiled wire casing 28 and the plastic cover 30, when force is applied to the handle in the direction toward the seat 12, the handle 10 will be deformed, flexing either upwardly or downwardly depending upon the point of application of such force. In this manner, when the vehicle is forced to suddenly stop and the passenger in the next seat is thrown forwardly against the handle 10, the deformation of the latter will prevent any bodily harm to the passenger. This should be contrasted with previous rigid handles mounted in this general manner which presented a rigid, nondeformable surface against which the passenger could be thrown and exposed to possible injury. Subsequent to relief of the force acting thereagainst, the handle 10, because of the resiliency of the casing 28 and the plastic cover 30, will return to its normal, self-supporting, FIG. 1 position.

If the handle 10 is desired to be removed for any reason, for example for cleaning of the cover 14, the end fittings 32 and 34 are loosened and the threaded shank portions thereof withdrawn from engagement with the threaded plates 22 and 24.

It will thus be seen that the present invention provides a flexible handle construction which is simple in construction and easy to install on a suitable mounting surface, and wherein such handle is resiliently deformable responsive to force applied thereagainst, thereby providing a unique safety advantage over presently existing handles of this general type.

Other modes of applying the principle of the invention may be employed, change being made as regards the details described, provided the features stated in any of the following claims or the equivalent of such be employed.

I therefore particularly point out and distinctly claim as my invention:

1. A flexible handle comprising a core assembly, an outer cover around said core assembly, means disposed at opposite ends of said handle for mounting said handle on a suitable mounting surface, said core assembly and said cover being self-supporting and resiliently deformable in all directions whereby force applied thereagainst effects deformation thereof, the core assembly and cover returning to their self-supporting position at the release of such force.

2. A flexible handle comprising a core assembly, an outer cover around said core assembly, said core assembly comprising a coiled wire casing and a cable disposed within said casing, end fitting means disposed around said cover at opposite ends thereof and rotatable relative thereto for mounting said handle on an adjacently disposed mounting surface, said core assembly and said cover being resiliently deformable whereby force applied thereagainst causes temporary deformation thereof, with the core assembly and cover returning to its self-supporting position at the cessation of such force.

3. The combination of claim 2 wherein the handle is generally U-shape and the cover is plastic and molded around said core assembly to form a unitary handle construction.

4. The combination of claim 2 wherein each of said end fitting means comprises a threaded shank end for mounting said handle to said mounting surface and a recessed opposite end portion for receiving said cover.

5. The combination of claim 4 wherein each of said end fitting means is rotatable relative to said cover, and means for retaining said end fitting means in assembled position.

6. The combination of claim 5 wherein each of said end fitting means is formed with a longitudinal bore through which said cable extends outwardly of said end fittings, said retaining means being disposed around said cable and fixed thereto below said end fitting means to maintain the latter in their assembled position.

7. A flexible handle mountable on a vehicle seat comprising a core assembly, an outer plastic cover around said core assembly, fitting means disposed at opposite ends of said cover, said fitting means including threaded shank portions engageable with threaded portions of said seat, said core assembly and said cover being resiliently deformable in all directions whereby force applied thereagainst causes temporary deformation thereof, with the core assembly and cover returning to its self-supporting position at the cessation of such force.

8. A flexible handle comprising a core assembly, an outer cover around said core assembly, said core assembly comprising a coiled wire casing and a cable disposed within said casing, said cover being plastic and molded around said core assembly, means disposed at opposite ends of said handle for mounting said handle on a suitable mounting surface, said core assembly and said cover being self-supporting and resiliently deformable whereby force applied thereagainst effects deformation thereof, the core assembly and cover returning to their self-supporting position at the release of such force.

9. A generally U-shape flexible handle mountable on a vehicle seat comprising a core assembly including a coiled wire casing and a cable extending therethrough, an outer plastic cover molded around said cover, means for retaining said fitting means on said opposite ends of said cover to permit rotation thereof relative to said cover, said fitting means including threaded shank portions engageable with threaded portions of said seat, said core assembly and said cover being resiliently deformable whereby force applied thereagainst causes temporary deformation thereof, with the core assembly and cover returning to its self-supporting position at the cessation of such force.

References Cited in the file of this patent

UNITED STATES PATENTS

| 1,875,614 | Karpen | Sept. 6, 1932 |
| 2,157,251 | Tinnerman | May 9, 1939 |
| 2,239,669 | Blake | Apr. 29, 1941 |
| 3,068,972 | Armstrong | Dec. 18, 1962 |
| 3,082,473 | West | Mar. 26, 1963 |

FOREIGN PATENTS

| 899,001 | Germany | Dec. 7, 1953 |
| 1,104,368 | Germany | Apr. 6, 1961 |